United States Patent
Chang et al.

(10) Patent No.: US 11,798,425 B2
(45) Date of Patent: Oct. 24, 2023

(54) PREAMBLE MANAGEMENT FOR UNMANNED AERIAL VEHICLES

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 17/964,269

(22) Filed: Oct. 12, 2022

(65) Prior Publication Data
US 2023/0036593 A1    Feb. 2, 2023

Related U.S. Application Data

(63) Continuation of application No. 16/642,534, filed as application No. PCT/US2018/051650 on Sep. 19, 2018, now Pat. No. 11,508,245.

(60) Provisional application No. 62/695,338, filed on Jul. 9, 2018, provisional application No. 62/564,481, filed on Sep. 28, 2017.

(51) Int. Cl.
G08G 5/00      (2006.01)
H04B 7/185     (2006.01)
H04W 4/90      (2018.01)

(52) U.S. Cl.
CPC ........... *G08G 5/0013* (2013.01); *G08G 5/006* (2013.01); *G08G 5/0008* (2013.01); *G08G 5/0069* (2013.01); *H04B 7/18506* (2013.01); *H04W 4/90* (2018.02)

(58) Field of Classification Search
CPC .... G08G 5/0013; G08G 5/0008; G08G 5/006; G08G 5/0069; H04B 7/18506; H04W 4/90; H04W 4/06; H04W 56/0005; H04W 4/00
See application file for complete search history.

(56) References Cited

U.S. PATENT DOCUMENTS

| | | | |
|---|---|---|---|
| 2011/0019694 A1 | 1/2011 | Kwon et al. | |
| 2014/0016534 A1 | 1/2014 | Kim et al. | |
| 2016/0227582 A1 | 8/2016 | Vajapeyam et al. | |
| 2018/0020431 A1 | 1/2018 | Cho et al. | |
| 2020/0174468 A1* | 6/2020 | Hong | G05D 1/0022 |
| 2020/0187262 A1 | 6/2020 | Hong | |

FOREIGN PATENT DOCUMENTS

| | | |
|---|---|---|
| JP | 2005-210640 A | 8/2005 |
| WO | 2008054112 A2 | 5/2008 |
| WO | 2008156321 A2 | 12/2008 |
| WO | 2011100596 A2 | 8/2011 |
| WO | 2015071025 A1 | 5/2015 |
| WO | 2018203402 A1 | 11/2018 |

* cited by examiner

*Primary Examiner* — Ashley Shivers

(57) ABSTRACT

A base station allocates unmanned aerial vehicles (UAVs) preambles for use by UAV user equipment (UE) devices that are different from terrestrial preambles allocated for terrestrial UE devices. The UAV preambles can be allocated to different subscription levels, such that each UAV UE device can only use UAV preambles associated with the UAV UE device's subscription level. The UAV UE device transmits random access request message using the selected UAV preamble and the base station responds with a random access response message indicating whether access is granted to the UAV UE device. The base station can dynamically manage access to the base station by limiting the subscription levels that are associated with the UAV preambles.

12 Claims, 5 Drawing Sheets

PREAMBLE MANAGEMENT FOR UNMANNED AERIAL VEHICLES

CLAIM OF PRIORITY

The present application is a continuation of U.S. application Ser. No. 16/642,534, U.S. Pat. No. 11,508,245, filed Feb. 27, 2020 and entitled "PREAMBLE MANAGEMENT FOR UNMANNED AERIAL VEHICLES"; which is a national stage application of PCT/US2018/051650, filed Sep. 19, 2018 and entitled "PREAMBLE MANAGEMENT FOR UNMANNED AERIAL VEHICLES"; which claims priority to Provisional Application No. 62/564,481, entitled "Method for access control of UAVs based on subscription level", filed Sep. 28, 2017, and to Provisional Application No. 62/695,338, entitled "Preamble management for unmanned aerial vehicles", filed Jul. 9, 2018, both of which are assigned to the assignee hereof and hereby expressly incorporated by reference in their entirety.

FIELD

This invention generally relates to wireless communications and more particularly to managing preambles for unmanned aerial vehicles (UAVs).

BACKGROUND

Unmanned aerial vehicles (UAVs), such as drones, have received increasing interest in the past few years. UAVs can be used to perform many different applications, including package delivery, real-time imaging, video surveillance, solar farm inspection, fire and storm assessment, search-and-rescue, monitoring of critical infrastructure, and wildlife conservation. Many of these emerging use cases could benefit from connecting the UAV to a cellular network as a user equipment (UE) device.

SUMMARY

A base station allocates unmanned aerial vehicles (UAVs) preambles for use by UAV user equipment (UE) devices that are different from terrestrial preambles allocated for terrestrial UE devices. The UAV preambles can be allocated to different subscription levels, such that each UAV UE device can only use UAV preambles associated with the UAV UE device's subscription level. The UAV UE device transmits random access request message using the selected UAV preamble and the base station responds with a random access response message indicating whether access is granted to the UAV UE device. The base station can dynamically manage access to the base station by limiting the subscription levels that are associated with the UAV preambles.

DETAILED DESCRIPTION

Figure 1:
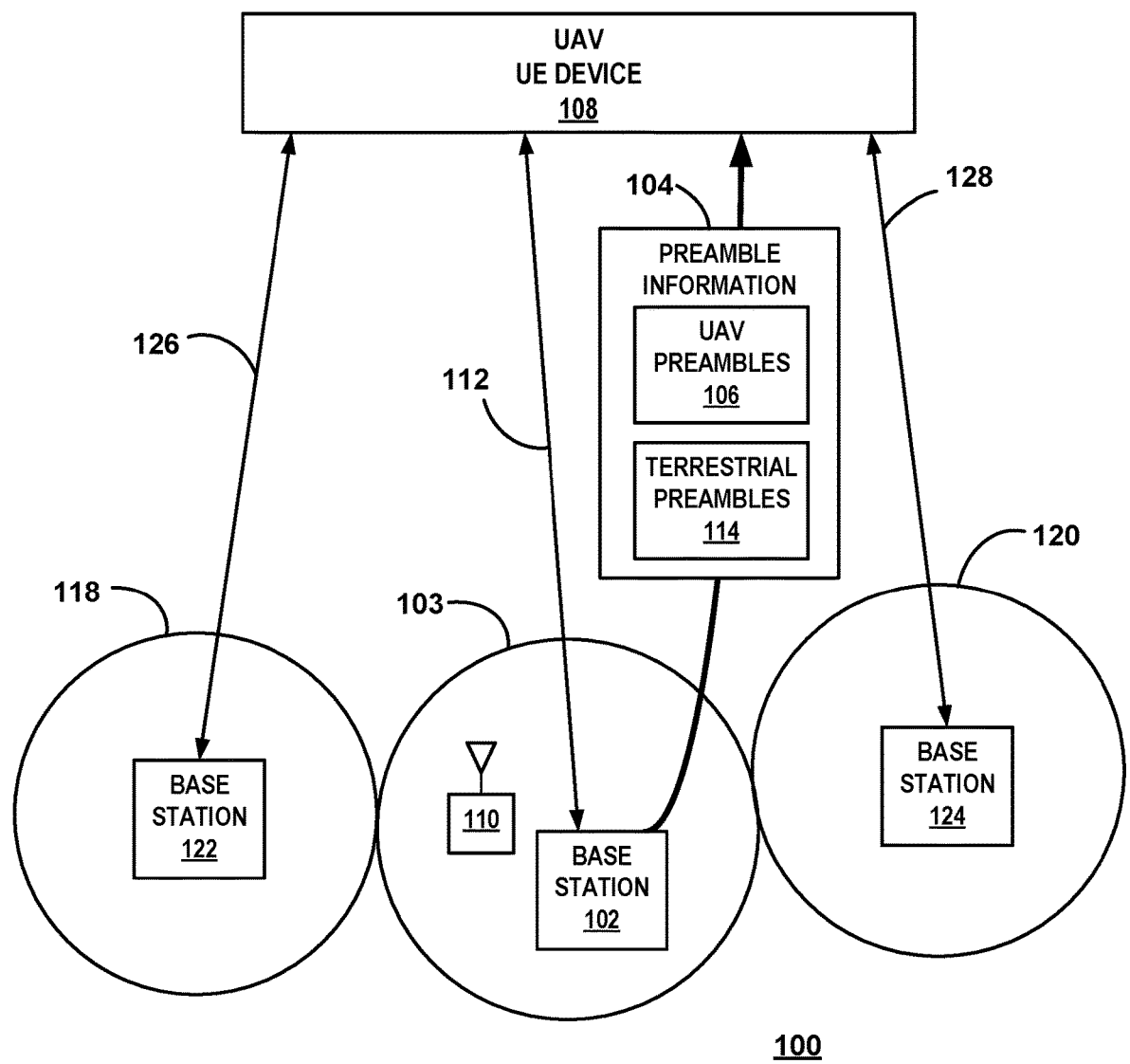
FIG. 1 is a block diagram of a communication system for an example where a base station transmits preamble information including unmanned aerial vehicle (UAV) preambles for use by UAV user equipment devices.

There are a number of important considerations when connecting an unmanned aerial vehicle (UAV) to a network as a user equipment (UE) device. One example of a network to which the UAV can be connected is a network that operates in accordance with at least revision of the 3rd Generation Partnership Project (3GPP) Long-Term Evolution (LTE) communication specification. In other examples, the network operates in accordance with a 5th Generation Wireless System (5G) new radio network communication specification. As is known, communication specifications evolve and are revised periodically. Examples of the implementation may include future revisions of communication specifications. Regardless of the particular network to which the UAV connects, enhancements may be identified to better prepare the cellular networks for the data traffic growth from UAVs, such as drones, in the coming years.

When the UAV is flying well above a base station (eNB) antenna height, the uplink signal, which is transmitted from the UAV, may be received by multiple cells (e.g., base stations) due to line-of-sight propagation conditions. Thus, the likelihood of the uplink signal from the UAV causing interference to neighboring cells increases as the altitude of the UAV increases. In the scenarios in which the uplink signals from the UAV are considered to be interference to one or more neighboring cells, the interference gives a negative impact to the UE devices on the ground (e.g., smartphones, Internet of Things (IoT) devices, etc.).

To prevent such uplink interference, one or more cells (base stations) that are not providing services to the UAV may vary their antenna beam patterns to steer away from the interfering UAV. In addition, the cell that is providing services to the UAV (e.g., serving cell or serving base station) may steer its antenna beam pattern towards the UAV. However, such antenna steering mechanisms are complicated and may impact services to terrestrial UE devices. Further, the additional UAV UE devices will decrease the volume of available communication resources and increase congestion in the network.

For the examples discussed herein, the cell (base station) dynamically manages access to the base station (cell) by managing the preambles used for transmitting random access request messages, such as Message 1 transmissions over the Physical Random Access Channel (PRACH) in 3GPP specifications. In one example, the base station transmits preamble information in a System Information Block 2 (SIB2) message where the preamble information includes terrestrial preambles for use by terrestrial UE devices and UAV preambles for use by UAV UE devices. The UAV preambles are associated with subscription levels assigned to the UAV UE devices. Therefore, each UAV preamble is associated with one of the subscription levels that may be assigned to UAV UE devices. If no UAV preambles are associated with a particular subscription level, those UAV UE devices having that subscription level will not be able to transmit a random access request message since no preamble is available for transmission. In some cases, the subscription level may be associated with the subscription to a service. In this case a UAV UE device may have subscribed to multiple services that are associated with different subscription levels. The base station can thereby limit which UAV UE devices can attempt to access the base station. In some situations, the base station may restrict all UAV UE devices from attempting to access the cell (base station) by not allocating any preambles to be associated with any of the subscription levels. In case the UAV UE has multiple services that are associated with different subscription levels, only certain services may be accessible. In other situations, the base station can allow only those UAV UE devices with the highest subscription level(s) to access the base station. For example, preambles may be allocated only to UAV UE devices providing emergency services.

FIG. 1 is a block diagram of a communication system 100 for an example where a base station 102 transmits preamble information 104 including unmanned aerial vehicle (UAV) preambles 106 for use by UAV user equipment devices. The communication system 100 is part of a radio access network (not shown) that provides various wireless services to UE devices that are located within the respective service areas of the various base stations that are part of the radio access network. The base station 102 is connected to the network through a backhaul (not shown) in accordance with known techniques. The base station 102 provides wireless services to a UAV UE device 108 and to a terrestrial UE device 110. The base station 102 communicates with the UAV UE device 108 via a wireless communication link 112.

The base station 102 is configured to transmit preamble information 104 that includes terrestrial preambles 114 and UAV preambles 106. The preamble information 104 is transmitted in a preamble message that may be a System Information Block 2 (SIB2) message in accordance with one or more versions of the 4G or 5G communication standards. The preambles 106, 114 may be shifted versions of a root sequence. The preambles are used by UE devices 108, 110 to transmit a random access request message when attempting to access the network through the base station 102. A UE device selects a preamble and transmits a random access request message to the base station using the selected preamble. The base station 102 transmits a random access response message to the UE device indicating whether access has been granted to the UE device.

Although the UAV 108 is located above service area 116 of the base station 102 in FIG. 1, base station 102, in this example, is the serving base station for the UAV 106. For example, although the service areas 116, 118, 120 are shown as two-dimensional areas in FIG. 1, it is understood that for purposes of providing services to a UAV, the service areas actually extend upwards vertically to provide services to UAVs that may be located at various altitudes above the service areas shown in FIG. 1. Specifically, the determination of which base station is used to serve the UAV UE device 108 in the Connected mode is controlled by the network according to multiple factors, such as loading of the neighboring base stations, the base station antenna configurations, and the downlink signal strength measurements reports from the UAV 108. In this regard, it is worth noting that, similar to the coverage area that can be provided to traditional, terrestrial UE devices 110 by a base station, the coverage area that can be provided to a UAV UE device by a base station can also be affected by distance, environmental conditions, obstructions, and interference.

In the example shown in FIG. 1, the communication link 112 is a Uu link between the UAV 108 and the base station (eNB) 102. The communication link 112 is configured to provide downlink communication from the base station 102 to the UAV 108 and to provide uplink communication from the UAV UE device 108 to the base station 102.

In the interest of clarity and brevity, communication system 100 is shown as having only two neighboring base stations 122, 124, which provide wireless services to UE devices located within their respective service areas 118, 120. In other examples, however, the communication system 100 could have any suitable number of base stations. In the example shown in FIG. 1, base station 102 is considered to be a serving base station since it is providing wireless services to the UAV UE device 108. Neighboring base stations 122, 124 are also capable of providing wireless services to the UAV UE device 108 via their respective communication links 126, 128, if the UAV UE device 108 is handed over to one of the neighboring base stations 122, 124. Communication links 126, 128 are similar to communication link 112. If, for example, the UAV UE device 108 is handed over to neighboring base station 122, then neighboring base station 122 would become the serving base station, and base station 102 would become a neighboring base station. For the purposes of the examples described herein, base stations are considered to be neighboring each other if they are relatively close to each other and/or the UAV UE device 108 can simultaneously receive signals from each of the neighboring base stations at a given time.

Base station 102, which is sometimes referred to as an eNodeB or eNB, communicates with the UAV UE device 108 by transmitting downlink signals via communication link 112. In the case of 5G based on New Radio, the base station is sometimes referred to as a gNB. Base station 102 also receives uplink signals transmitted from the UAV UE device 108 via communication link 112. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

For the example, the preamble information 104 includes UAV preambles 106 and terrestrial preambles 114 where the terrestrial preambles 114 are only used by terrestrial UE devices 110 and UAV preambles are only used by UAV UE devices 108. The UAV UE device 108 can select only a UAV preamble. In some examples, each UAV preamble is associated with a subscription level where the UAV UE devices 108 are each assigned a subscription level. The set of subscription levels may include any number of subscription levels. The UAV preambles 104 may be transmitted in the preamble message and may include any number of preambles associated with each subscription level. In some situations, no UAV preambles are associated with one or more subscription levels. As discussed below, no UAV preambles may be included in the preamble message in some circumstances. As discussed below, the base station may restrict access to the base station by UAV UE devices in this way.

The UAV UE device selects a preamble from the set of UAV preambles associated with the UAV UE device's subscription level then generates a random access request message using the select UAV preamble. The random access request message is transmitted by the UAV UE device and received by the base station. In response, the base station transmits a random access response message to the UAV UE device indicating whether the UAV UE device has been granted access to the base station and is authorized to communicate with the base station. If access has been granted, the UAV UE device and the base station exchanges messages to establish communication.

During operation, the serving base station 102 provides wireless services to UAV UE device 108 via the communication link 112. Due to the altitude at which the UAV UE device 108 operates, the uplink transmissions from the UAV UE device 108 may cause interference with one or more neighboring base stations 122, 124. In many situations, the interference may occur more easily than with terrestrial UE devices. More specifically, the uplink data transmissions from UAV 106 may interfere with the uplink data transmissions being transmitted by UE devices located within the respective service areas 118, 120 of the neighboring base stations 122, 124. As mentioned above, the examples described herein include a method and a system for providing preambles used only by the UAV UE devices allowing the base station 102 to manage interference and congestion in the cell.

Figure 2A:
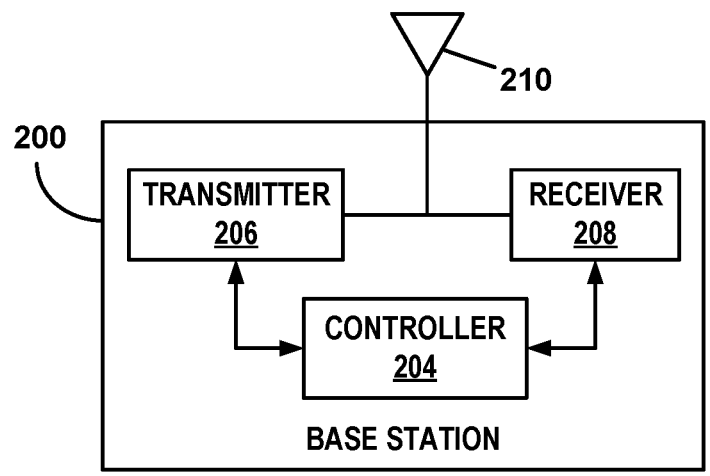
FIG. 2A is a block diagram of a base station suitable for use as a serving base station or neighboring base station.

FIG. 2A is a block diagram of a base station 200 suitable for use as a serving base station or neighboring base station, such as the base stations 102, 122, 124 discussed above. Therefore, the example of FIG. 2A shows the circuitry and configuration of serving base station 102 where the same base station circuitry and configuration can be utilized for neighboring base stations 122, 124 in the example of FIG. 1. In other examples, either of the base stations may have circuitry and/or a configuration that differs from that of the serving base station 102 shown in FIG. 2A. The base station 102 comprises a controller 204, a transmitter 206, and a receiver 208, as well as other electronics, hardware, and code. The base station 102 is any fixed, mobile, or portable equipment that performs the functions described herein. The various functions and operations of the blocks described with reference to the base station 102 (200) may be implemented in any number of devices, circuits, or elements. Two or more of the functional blocks may be integrated in a single device, and the functions described as performed in any single device may be implemented over several devices.

For the example of FIG. 2A, the base station 200 may be a fixed device or apparatus that is installed at a particular location at the time of system deployment. Examples of such equipment include fixed base stations or fixed transceiver stations. In some situations, the base station 200 may be mobile equipment that is temporarily installed at a particular location. Some examples of such equipment include mobile transceiver stations that may include power generating equipment, such as electric generators, solar panels, and/or batteries. Larger and heavier versions of such equipment may be transported by trailer. In still other situations, the base station 200 may be a portable device that is not fixed to any particular location. Accordingly, the base station 200 may be a portable user device, such as a UE device, in some circumstances.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components, such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 112 and, in so doing, can apply any one of a plurality of modulation orders. The demodulator demodulates any uplink signals received at the base station 200 in accordance with one of a plurality of modulation orders.

Figure 2B:
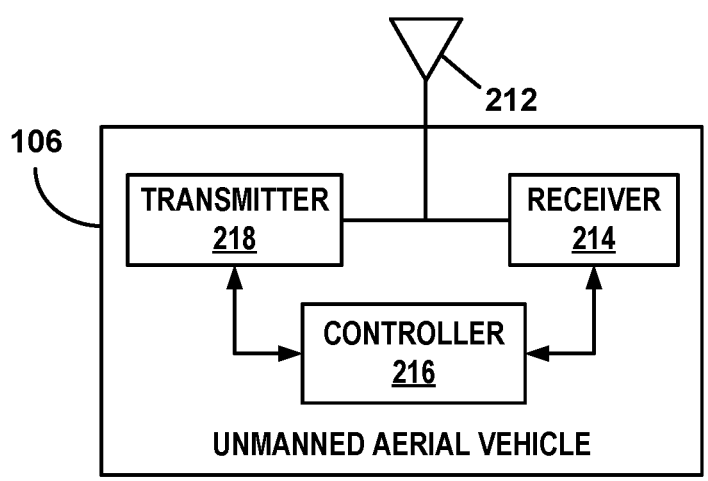
FIG. 2B is a block diagram of an unmanned aerial vehicle (UAV) user equipment (UE) device suitable for use as the UAV UE device in the example of FIG. 1.

FIG. 2B is a block diagram of an unmanned aerial vehicle (UAV) user equipment (UE) device 211 suitable for use as the UAV UE device 108 in the example of FIG. 1. For the example of FIG. 2B, the UAV UE device 211 electronics are configured to communicate directly with a base station 102, such as the base station 102. For example, where the UAV UE device 211 is a UAV UE device 108, the UAV UE device 211 receives downlink signals via communication link 112 using antenna 212 and receiver 214. The UAV UE device 211 transmits uplink signals with transmitter 218 and antenna 212.

In addition to the antenna 212, receiver 214 and transmitter 218, the UAV UE device 211 further comprises a controller 216, as well as other electronics, hardware, and code. The UAV UE device 211 is any fixed, mobile, or portable equipment that performs the functions described herein. The various functions and operations of the blocks described with reference to the UAV UE device 211 (108) may be implemented in any number of devices, circuits, or elements. Two or more of the functional blocks may be integrated in a single device, and the functions described as performed in any single device may be implemented over several devices.

For the examples described herein, the UAV UE device 211 (108) is any wireless communication device that is capable of flight without having a human pilot aboard. In some examples, UAV UE device 211 (108) may be connected to an Evolved Universal Mobile Telecommunications System Terrestrial Radio Access Network (E-UTRAN) when flying and when on the ground. A drone would be one example of UAV UE devices 211, 108. In the instances where the UAV UE device 211 (108) is a drone, the flight of the UAV UE device 108 may operate with various degrees of autonomy, either under remote control by a human operator, autonomously by an onboard computer, or autonomously by a remote computer. In other cases, the UAV UE device 211 (108) may be a kite whose height can be manually adjusted by a human operator. In still other cases, the UAV UE device 211 (108) may be a kite whose height can be adjusted by an adjustable mechanized tether, which can be controlled by a human operator, by a programmed algorithm, or by the UAV UE device 211 (108) itself. Other UAV devices may include weather balloons.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components, such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UAV UE device 211 (108).

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

Figure 3:
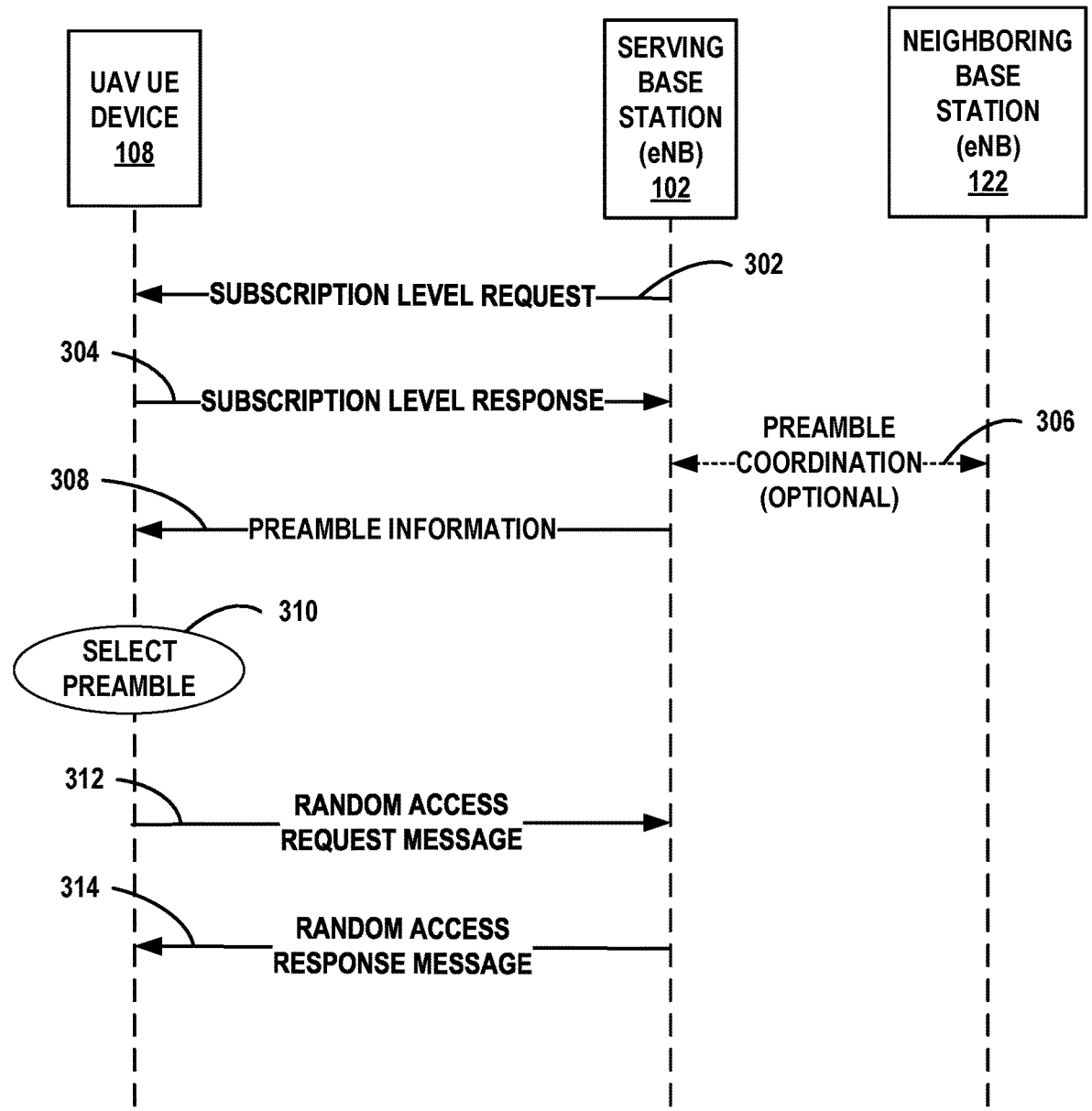
FIG. 3 is an illustration of an example of messaging between the UAV UE device and the serving base station and a neighboring base station.

FIG. 3 is an illustration of an example of messaging between the UAV UE device 108 and the serving base station 102 and a neighboring base station 122. The messaging technique of FIG. 3 is one example of the messaging for managing preambles for the system of FIG. 1. In the interest of clarity and brevity, the example of FIG. 3 may not depict all of the messages transmitted between the entities. Further, one or more of the messages that are shown in FIG. 3 may be omitted in some circumstances. In some situations, the transmissions may be combined with each other and/or substituted in any suitable manner that facilitates the functions discussed herein.

At transmission 302, the serving base station requests UAV subscription level information from the UAV UE devices. The serving base station transmits a subscription level request message. For the example, the message is broadcast by System Information. In some situations, known techniques for performing Counting Requests can be applied to make the inquiry of the UAV UE devices in the area.

In response to the inquiry by the base station 102, the UAV UE device 108 sends a subscription level response message at transmission 304. The subscription level may be stored in UAV UE device memory, such a Universal Subscriber Identity Module (USIM), may be pre-defined, or may be provided by a network entity, such as the Mobility Management Entity (MME). The UAV UE device retrieves the subscription level information and generates the subscription response message. The subscription level information indicates the subscription level of the UAV UE device 108. The base station 102 allows the UAV UE device to transition to the Connected mode to provide this information if the UAV UE device is in the Idle mode. The UAV UE device 108 is not required to select a subscription-based preamble for sending the subscription response message. In other cases, the network may only require UAV UE devices that are already in the Connected mode to respond to the subscription level request. Although any of numerous messages and transmission techniques can be used to send the subscription response message, suitable examples include sending the message via the UE Information Message or by an Enhanced Counting Response Message. In situations where the UAV UE device has no additional activities other than to respond to the subscription level request, the base station 102 may release the UAV UE device to IDLE.

At transmission 306, the base station may optionally coordinate with one or more neighboring base stations to establish common preamble resources for UAV UE devices based on subscription level in order that neighboring base stations allocate the same amount of preamble resources for each subscription level. The coordination is useful because the UAV UE device transmissions in the connected mode (CONN mode) can readily interfere with many neighboring base stations. In one example, an entity, such as an MCE in MBMS, handles the coordination. Although FIG. 3 shows transmission as a single double-headed arrow, the coordination may include multiple transmissions between the base stations 102, 122.

At transmission 308, the serving base station 102 transmits the preamble information 104. As discussed above, the preamble information 104 is sent in a preamble message System Information message, such as a SystemInformationBlockType2 (SIB2) and includes terrestrial preambles 114 and UAV preambles 106. In addition, the preamble information identifies the UAV preambles that are associated with each subscription level that the base station has determined will be allowed to attempt to access the base station. The serving base station, therefore, provides the common preambles for each subscription level in System Information. In some circumstances, the base station determines whether higher subscription level UAVs may choose preambles from lower subscription level.

At event 310, the UAV UE device selects one of the available preambles provided in SIB that is associated with the subscription level of the UAV UE device 108. In some cases the UAV may only select among the available preamble resources if the UAV UE is authorized to operate as a UAV UE e.g., based on the MME's authorization. Alternatively, the UAV UE device may select the available preambles if the NAS layer of the UE has indicated to the AS layer that the UE's current operation mode is for UAV operation. In other cases, if the subscription level-based preambles are not available or the UE is not authorized to operate as an UAV UE device, the operator may allow the UAV UE to select preambles for terrestrial UEs.

At transmission 312, the UAV UE device 108 transmits a random access request message using the selected UAV preamble. For a system operating in accordance with 3GPP specification, the random access request message is referred to as "Msg 1".

At transmission 314, the serving base station 102 transmits a random access response message in response to the random access request message. The serving base station has the option to accept or reject the UAV UE device's attempt to access the base station and enter the Connected mode (CONN mode). Accordingly, the random access response message (or sometimes referred to as Msg 2) indicates to the UAV UE device whether access has been granted. If the selected preamble used for the random access request message is associated with Contention Based Random Access (CBRA), contention resolution is needed and is completed after Msg 4 is sent to the UAV UE device as typically performed for terrestrial UEs.

Figure 4:
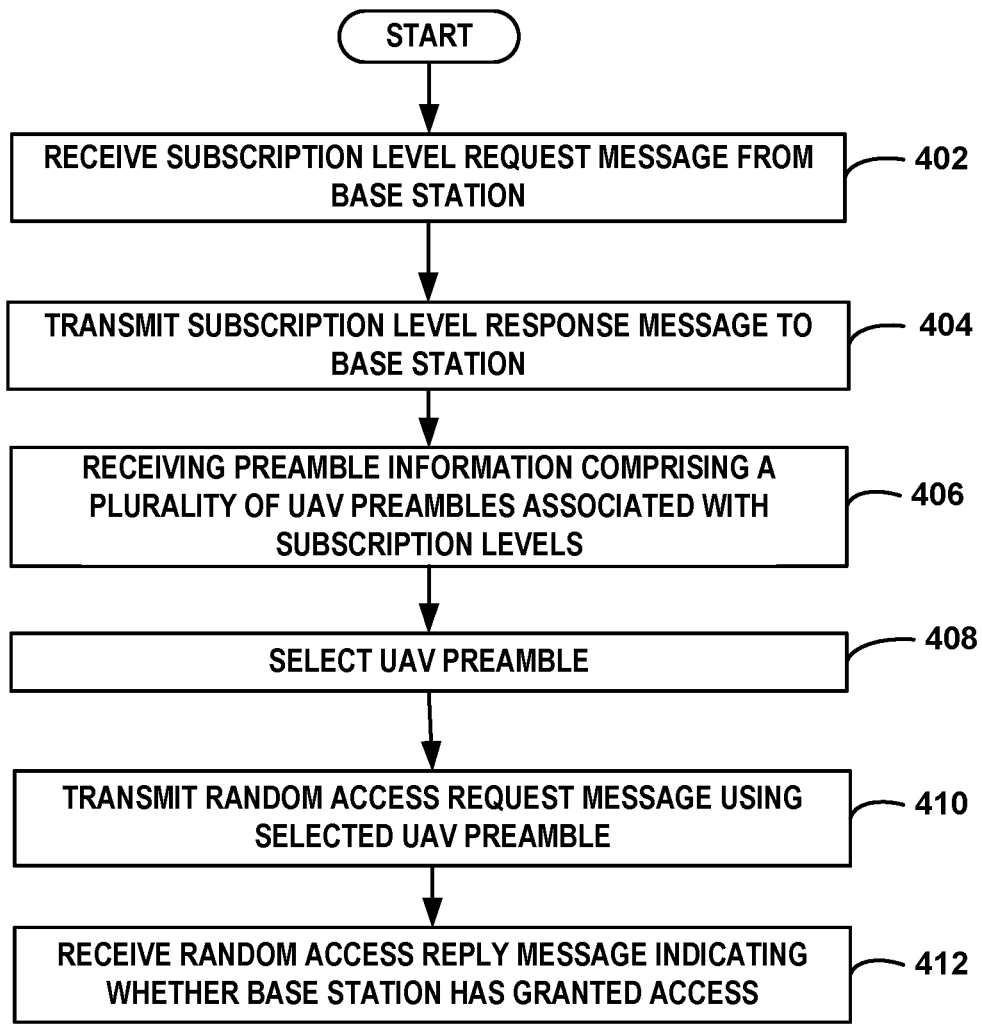
FIG. 4 is a flowchart of an example of a method of preamble and network access management performed at the UAV UE device.

FIG. 4 is a flowchart of an example of a method of preamble and network access management performed at the UAV UE device 108. The steps for the example of FIG. 4 may be performed in a different order than described herein and some steps may be performed simultaneously. In some situations, one or more of the steps may be omitted. One or more additional steps may be added.

At step 402, the UAV UE device receives a subscription level request message from the serving base station requesting UAV subscription level information from the UAV UE devices. For the example, the message is broadcast by System Information. In some situations, known techniques for performing Counting Requests can be applied to make the inquiry of the UAV UE devices in the area.

At step 404, the UAV UE device transmits a subscription level response message in response to the inquiry by the base station 102. The subscription level of the UAV UE device may be stored in the UAV UE device's memory, such a USIM, may be pre-defined, or may be provided by a network entity, such as the Mobility Management Entity (MME). The UAV UE device retrieves the subscription level information and generates and transmits the subscription level response message. The subscription level information indicates the subscription level of the UAV UE device 108. The UAV UE device transitions to the Connected mode to transmit the information. Although any of numerous messages and transmission techniques can be used to send the subscription response message, suitable examples include sending the message via the UE Information Message or by an Enhanced Counting Response Message. Where the UAV UE device has no additional activities other than to respond to the subscription level request, the base station 102 may release the UAV UE device to IDLE.

At step 406, preamble information 104 is received from the serving base station 102. The preamble information 104 comprises a plurality of UAV preambles associated with UAV subscription levels. For the example, the preamble information 104 is sent in a preamble System Information message, such as a SIB2, and includes terrestrial preambles 114 and UAV preambles 106. The preamble information 102 identifies the UAV preambles that are associated with each subscription level that the base station has determined will be allowed to attempt to access the base station. The serving base station, therefore, provides the common preambles for each subscription level in System Information. In some circumstances, the base station determines whether higher subscription level UAVs may choose preambles from lower subscription level.

In some situations, the serving base station 102 may provide a dedicated UAV preamble associated with a particular subscription level and dedicated to UAV UE device. The dedicated preamble may be assigned to the UAV UE device while the UAV UE device is in CONN mode. This, for example, could be when the UAV UE device transmits the subscription level response message to the serving base station 104 at step 404. The base station may indicate a validity timer for the dedicated preamble where the dedicated preamble can no longer be used after the timer expires. This is to ensure that the dedicated preamble is not tied up by a particular UAV UE device in case the UAV UE device does not establish a connection to the base station.

At step 408, the UAV UE device selects one of the available preambles provided in SIB that is associated with the subscription level of the UAV UE device 108. In some situations, the preamble information will not include any UAV preambles associated with the subscription level of UAV UE device. In these circumstances, the UAV UE device is restricted from accessing the serving cell.

At step 410 the UAV UE device 108 transmits a random access request message using the selected UAV preamble. For a system operating in accordance with 3GPP specification, the random access request message is referred to as "Msg 1". Where the base station has provided a dedicated preamble, the UAV UE device uses the dedicated preamble to send the access request message which is not contested.

At step 412, a random access response message is received from the serving base station 102. The random access response message indicates to the UAV UE device whether access has been granted to the serving cell. If access has been granted, UAV UE device enters the Connected mode (CONN mode) in accordance with known techniques after contention resolution if the selected preamble is associated with CBRA. If access is denied, the UAV UE device continues with access attempts in accordance with known techniques.

Figure 5:
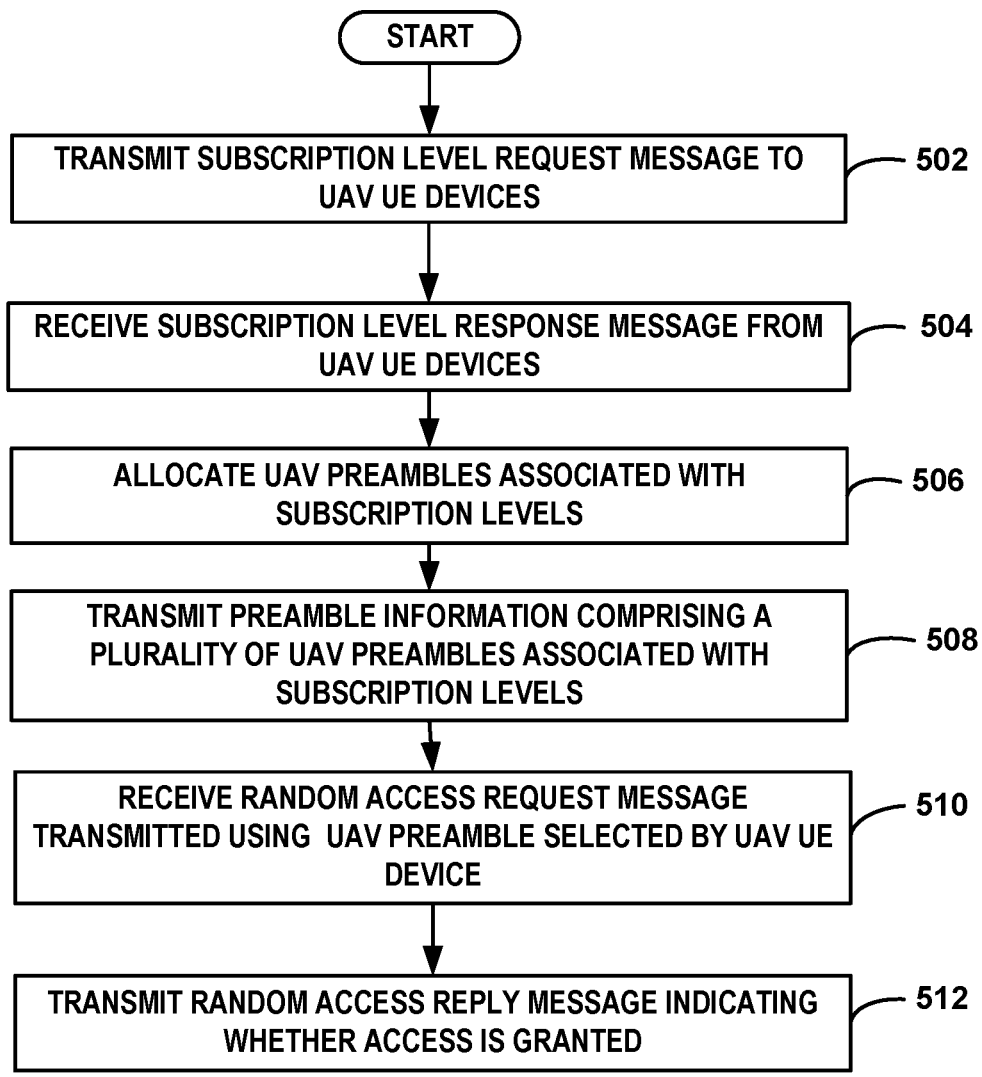
FIG. 5 is a flowchart of an example of a method of preamble and network access management performed at the serving base station.

FIG. 5 is a flowchart of an example of a method of preamble and network access management performed at the serving base station 102. The steps for the example of FIG. 5 may be performed in a different order than described herein and some steps may be performed simultaneously. In some situations, one or more of the steps may be omitted. One or more additional steps may be added.

At step 502, the serving base station requests UAV subscription level information from the UAV UE devices. The serving base station transmits a subscription level request message. For the example, the message is broadcast by System Information. In some situations, known techniques for performing Counting Requests can be applied to make the inquiry of the UAV UE devices in the area.

At step 504, a subscription level response message is received from the UAV UE device providing the subscription level information of the UAV UE device which indicates the subscription level of the UAV UE device 108. The base station 102 allows the UAV UE device is to transition to the Connected mode to provide this information. Although any of numerous messages and transmission techniques can be used to send the subscription response message, suitable examples include sending the message via the UE Information Message or by an Enhanced Counting Response Message. The UAV UE device 108 is not required to select a subscription-based preamble for sending the subscription response message. In other cases, the network may only require UAV UE devices that are already in the Connected mode to respond to the subscription level request. The UAV UE device returns to the IDLE state after the message is received.

At step 506, the base station allocates the UAV preambles associated with subscription levels. Based on level of congestion and/or interference at the base station and other factors. For example, at a given time, if the base station has 10 preambles it can allocate to UAV UE devices and there are 3 subscription levels whereby subscription level 1 has the highest priority and subscription level 3 has the lowest priority, the base station may allocate 5 preambles to subscription level 1, 3 preambles to subscription level 2 and 1 preamble to subscription level 3. In another example, if an emergency were to occur whereby certain UAV UE devices are used for public safety, then the subscription level associated with the public safety UAV UE devices will have the highest priority and the base station may allocated all the available preambles to this subscription level. It may be assumed that the preamble for subscription levels are typically allocated semi-statically (i.e., the preamble allocation do not change very frequently).

In some situations, the base station may coordinate with one or more neighboring base stations to establish common preamble resources for UAV UE devices based on subscription level in order that neighboring base stations allocate the same amount of preamble resources for each subscription level. The coordination is useful because the UAV UE device transmissions in the connected mode (CONN mode) can readily interfere with many neighboring base stations. In one example, an entity, such as an MCE in MBMS, handles the coordination.

In some situations, where congestion is relatively high, the base station may determine that no preambles should be allocated to UAV UE devices. By refraining from allocating any preambles to any subscription levels, the base station restricts all UAV UE devices from attempting to access the base station.

At step 508, the serving base station 102 transmits the preamble information 104. As discussed above, the preamble information 104 is sent in a preamble message in a System Information message, such as a SIB2, and includes terrestrial preambles 114 and UAV preambles 106. In addition, the preamble information identifies the UAV preambles that are associated with each subscription level that the base station has determined will be allowed to attempt to access the base station. The serving base station, therefore, provides the common preambles for each subscription level in System Information. In some circumstances, the base station determines whether higher subscription level UAVs may choose preambles from lower subscription level.

Alternatively, the serving base station 102 also has the option to provide a UAV UE device with a dedicated preamble associated with a particular subscription level and the particular UAV UE device. Since this preamble is dedicated for a particular UAV UE device, such a preamble is considered contention free. The dedicated preamble may be assigned to the UAV UE device while the UAV UE device is in CONN mode. This, for example, could be when the UAV UE device transmits the subscription level response message to the serving base station 404. Therefore, when the UAV UE device transitions to the IDLE mode, it may use this dedicated preamble for connection establishment. Additionally, the base station may indicate a validity timer for this dedicated preamble. The dedicated preamble can no longer be used after the timer expires. This is to ensure that the dedicated preamble is not tied up by a particular UAV UE device in case the UAV UE device does not establish a connection to the base station.

At step 510, a random access request message is received from the UAV UE device 108. The message is transmitting using a UAV preamble selected by the UAV UE device that is associated with its subscription level. For a system operating in accordance with 3GPP specification, the random access request message is referred to as "Msg 1". Where the random access request message uses a dedicated preamble, other UE devices are not using the preamble and the access request is contention free.

At step 512, the serving base station 102 transmits a random access response message in response to the random access request message. The serving base station has the option to accept or reject the UAV UE device's attempt to access the base station and enter the Connected mode (CONN mode). Accordingly, the random access response message indicates to the UAV UE device whether access has been granted.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
receiving, at an unmanned aerial vehicle (UAV), preamble information comprising a plurality of terrestrial preambles and a plurality of UAV preambles, the plurality of terrestrial preambles allocated for use by terrestrial user equipment (UE) devices to attempt access to a base station, the plurality of UAV preambles allocated for use by airborne UAVs to attempt access to the base station;
selecting, from the preamble information, one of the UAV preambles of the plurality of UAV preambles as a selected UAV preamble;
transmitting a random access message using the selected UAV preamble; and
receiving, from the base station, a random access response message indicating whether access to the base station is granted.

2. The method of claim 1, wherein receiving the preamble information comprises receiving the preamble information in a broadcast message.

3. The method of claim 1, wherein receiving the preamble information comprises receiving the preamble information within a System Information message.

4. An unmanned aerial vehicle (UAV) comprising:
a receiver configured to receive preamble information comprising a plurality of terrestrial preambles and a plurality of UAV preambles, the plurality of terrestrial preambles allocated for use by terrestrial user equipment (UE) devices to attempt access to a base station, the plurality of UAV preambles allocated for use by airborne UAVs to attempt access to the base station;
a controller configured to select, from the preamble information, one of the UAV preambles of the plurality of UAV preambles as a selected UAV preamble; and
a transmitter configured to transmit a random access message using the selected UAV preamble, the receiver further configured to receive, form from the base station, a random access response message indicating whether access to the base station is granted to the UAV.

5. The UAV of claim 4, wherein the receiver is configured to receive preamble information in a broadcast message.

6. The UAV of claim 4, wherein the receiver is configured to receive the preamble information within a system information message.

7. A method comprising:
receiving, at an unmanned aerial vehicle (UAV), preamble information comprising a plurality of terrestrial preambles and a plurality of UAV preambles;
selecting, from the preamble information and only if the UAV is authorized to operate as a UAV user equipment (UE) with a base station, one of the UAV preambles of the plurality of UAV preambles as a selected UAV preamble;

transmitting a random access message using the selected UAV preamble; and receiving, from the base station, a random access response message indicating whether access to the base station is granted.

8. The method of claim 7, wherein receiving the preamble information comprises receiving the preamble information in a broadcast message.

9. The method of claim 7, wherein receiving the preamble information comprises receiving the preamble information in a system information message.

10. An unmanned aerial vehicle (UAV) comprising:
a receiver configured to receive preamble information comprising a plurality of terrestrial preambles and a plurality of UAV preambles;
a controller configured to select, from the preamble information and only if the UAV is authorized to operate as a UAV user equipment (UE) with a base station, one of the UAV preambles of the plurality of UAV preambles as a selected UAV preamble; and
a transmitter configured to transmit a random access message using the selected UAV preamble, the receiver further configured to receive, from the base station, a random access response message indicating whether access to the base station is granted to the UAV.

11. The UAV of claim 10, wherein the receiver is configured to receive preamble information in a broadcast message.

12. The UAV of claim 10, wherein the receiver is configured to receive the preamble information within a system information message.

* * * * *